United States Patent
Gladstone et al.

(10) Patent No.: US 6,911,903 B2
(45) Date of Patent: Jun. 28, 2005

(54) TIRE PRESSURE INDICATOR

(75) Inventors: Peter Gladstone, Arlington, MA (US); Jason A. Morris, Melrose, MA (US); Michael D. Tinstman, Lynn, MA (US); Marwan M. Aylouche, Marblehead, MA (US); Robert S. Holland, Peabody, MA (US)

(73) Assignee: Tagg Technology Corp., Arlington, MA (US)

( * ) Notice: Subject to any disclaimer, the term of this patent is extended or adjusted under 35 U.S.C. 154(b) by 0 days.

(21) Appl. No.: 10/636,491

(22) Filed: Aug. 7, 2003

(65) Prior Publication Data

US 2005/0028721 A1 Feb. 10, 2005

(51) Int. Cl.[7] .............................................. B60C 23/00
(52) U.S. Cl. ...................... 340/442; 340/444; 340/447; 116/34 R; 73/146.8
(58) Field of Search ................................ 340/442, 443, 340/444, 445, 446, 447, 448; 73/146.5, 146.8; 116/34 R, 34 B, 34 A; 152/152.1

(56) References Cited

U.S. PATENT DOCUMENTS

| | | | |
|---|---|---|---|
| 3,508,193 A | 4/1970 | Giovannelli et al. ........... 340/58 |
| 3,537,068 A | 10/1970 | Amundsen, Jr. ............. 340/58 |
| 3,670,688 A | 6/1972 | Seaberg ........................ 116/34 |
| 3,719,198 A | 3/1973 | Wilhelm et al. ............. 137/228 |
| 3,760,350 A | 9/1973 | Johnson ........................ 340/58 |
| 3,889,530 A | 6/1975 | Bluem ....................... 73/146.8 |
| 3,906,988 A | 9/1975 | Mottram ..................... 137/227 |
| 3,938,078 A | 2/1976 | Davis et al. ................... 340/58 |
| 3,994,312 A | 11/1976 | Tanner et al. ............... 137/226 |
| 3,999,431 A | 12/1976 | Makarainen ............... 73/146.5 |
| 4,072,048 A | 2/1978 | Arvan ....................... 73/146.8 |
| 4,103,549 A | 8/1978 | Schmidt .................... 73/146.8 |
| 4,116,157 A | 9/1978 | Evans ........................ 116/125 |
| 4,136,560 A | 1/1979 | Gellos ........................ 73/146.8 |
| 4,159,465 A | 6/1979 | Hatcher ........................ 340/58 |
| 4,362,121 A | 12/1982 | Pegram ..................... 116/34 R |
| 4,464,929 A | 8/1984 | Willis ........................ 73/146.8 |
| 4,606,391 A | 8/1986 | Achterholt .................. 152/431 |
| 4,944,323 A | 7/1990 | Bartholomew et al. ...... 137/227 |
| 5,115,832 A | 5/1992 | Higdon et al. .............. 137/227 |
| 5,641,902 A | 6/1997 | Hong ........................ 73/146.8 |
| 5,687,672 A * | 11/1997 | Gabriel ..................... 116/34 R |
| 5,819,779 A | 10/1998 | Takemura et al. ........... 137/229 |
| 5,929,330 A * | 7/1999 | Ford ......................... 73/146.8 |
| 6,374,666 B1 * | 4/2002 | Lemberger et al. ........ 73/146.8 |
| 6,525,655 B2 * | 2/2003 | Huang ........................ 340/442 |
| 6,531,960 B1 | 3/2003 | Gladstone et al. .......... 340/442 |

* cited by examiner

Primary Examiner—Anh V. La
(74) Attorney, Agent, or Firm—Weingarten, Schurgin, Gagnebin & Lebovici LLP (57) ABSTRACT

A tire pressure indicator for coupling with a valve stem of a tire. The tire pressure indicator provides a first visual indication in the event that the tire pressure is below a first threshold limit and a second visual indication if the tire pressure is above a second threshold limit. The pressure indicator includes a dome shaped indicator and a dome shaped cover that is mounted over the indicator. The cover includes a plurality wedge shaped transparent viewing windows extending from near the top of the dome. The transparent viewing windows are separated by opaque portions. The indicator has a plurality of alternating wedge shaped areas of first and second colors extending from near the top of the dome to the lower peripheral edge of the indicator. The rotation of the indicator is related to the tire pressure. In one orientation of the indicator that occurs when the tire pressure is below a first predetermined limit, the first color is visible through the transparent viewing windows of the outer dome. In a second orientation of the inner dome that exists when the tire pressure is above a second predetermined limit, the second color is visible through the viewing windows of the outer dome.

12 Claims, 8 Drawing Sheets

TIRE PRESSURE INDICATOR

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

This invention is directed to a tire pressure indicator that can readily be installed on valve stems of vehicle tires to provide a highly visible indication when the tire pressure is above or below a predetermined limit.

Proper maintenance of tire pressure is important in the operation of a motor vehicle for a number of reasons. First, it is noted that under inflation of vehicular tires is the leading cause of tire failure. Second, the maintenance of proper tire inflation promotes more even tread wear and thus increases the life of the tire. Lastly, a vehicle with properly inflated tires will exhibit greater gas mileage than a vehicle with under inflated tires.

Tire failure is generally caused by overheating which is typically caused by under inflation of the tire and/or by overloading of the vehicle. More specifically, tire heating is caused by the normal flexure of the tire sidewalls and road friction. If the tires are properly inflated, the sidewalls will be stiff and sidewall flexure is reduced. However, if the tires are under inflated, greater sidewall flexure along with tire heating results. Thus, in the circumstance in which tires are under inflated, overheating and tire failure are more likely to occur.

Various tire pressure measurement devices have been developed to allow the measurement of tire pressure. For example, hand-held tire pressure gauges are well known. The user typically slides such a pressure gauge over the valve stem of the tire until the gauge seals with the value stem so as to minimize the escape of air during the measurement process. Once the gauge has been appropriately positioned, the user notes the pressure value displayed on the gauge. The user then compares the measured value to the tire pressure value recommended by the tire manufacturer to determine if the tire is under inflated. The user must either refer to a manual or other source for this information or commit this value to memory.

Mechanical tire pressure gauges of the above-described type typically require a great deal of user intervention or do not provide a constant and instantaneous indication of whether the tire is under inflated. Tire pressure is often not measured due to the inconvenience associated with the use of typical mechanical tire pressure gauges and consequently drivers are often operating their vehicles on under inflated tires.

It would therefore be desirable to have a tire pressure indicator that may be installed on the valve stem and left in place so as to provide an immediate visual indication upon inspection if a tire is exhibiting a pressure below a predetermined limit.

BRIEF SUMMARY OF THE INVENTION

A tire pressure indicator for coupling with a valve stem of a tire is disclosed. The tire pressure indicator provides a first visual indication in the event that the tire pressure is below a first threshold limit and a second visual indication if the tire pressure is above a second threshold limit.

The presently disclosed indicator includes a base having internal threads that is mateable with a valve stem by threading the base onto cooperative threads of the valve stem. The base having first and second ends includes a pin that opens the valve within the valve stem when the first end of the base is threaded onto the valve stem. At least one opening is provided through the base. A diaphragm is disposed over the second end of the base and a collar having first and second ends is mounted to the base so as to capture the diaphragm between the second end of the base and the collar. The center of the diaphragm moves away from the valve stem in response to increased air pressure on the side of the diaphragm in fluid communication with first end of the base. The distance that the center of the diaphragm moves is a function of the air pressure within the pressure range of interest.

A post or piston is disposed over the diaphragm and a spring is disposed around the post between the second end of the collar and the diaphragm. The spring serves to urge the diaphragm downward as the pressure below the diaphragm decreases.

A dome shaped indicator is rotatably mounted to the post and moves up and down in response to movement of the center of the diaphragm under varying pressure while permitting rotation of the indicator with respect to the diaphragm. The outer surface of indicator has alternating colored segments that extend from near the top of the dome to the lower periphery of the dome. A plurality of recesses, each having a ramp formed on a surface of the respective recess, is formed in the outer surface of the indicator.

A dome shaped cover is disposed over the indicator and is mounted to the collar. The cover includes alternating clear and opaque arcuate segments that extend generally from the top center of the cover toward the lower periphery of the cover. A first set of colored segments is visible through the clear segments of the cover when the tire pressure is above a predetermined limit and a second set of colored segments is visible through the clear segments of the cover when the tire pressure is below the predetermined pressure limit. A plurality of projections is provided on the inside surface of the cover, each projection having a ramped surface that is cooperative with the ramped surfaces in the recesses of the indicator to define a first rotational position of the indicator.

More specifically, in response to air pressure above a predetermined pressure limit at the first end of the body, the diaphragm deforms and the piston moves toward the cover causing the indicator to similarly move toward the cover. The ramps projecting from the cover cooperate with the ramps in the recesses in the outer surface of the indicator to align the first set of alternating colored segments of the indicator with the transparent segments of the cover in the first predetermined position so that the first set of alternating colored segments are plainly visible through the transparent segments of the cover.

The lower peripheral edge of the indicator includes a serrated profile that includes ramped surfaces. The ramps in the serrated edge along the lower periphery of the indicator cooperate with ramps formed on the outside surface of the collar to define a second rotational position of the indicator when the tire pressure is below the predetermined pressure limit. More specifically, when the tire pressure is below the specified pressure limit, the spring urges the diaphragm and the post downward causing the indicator to also move downward. The ramps on the lower periphery of the indicator slide downward along the ramps of the collar causing the indicator to rotate into the second predetermined position in which the second set of colored segments are plainly visible through the transparent segments of the cover. In the foregoing manner, a visible indication is provided as to whether the tire pressure is above or below the predetermined pressure limit.

Other features, aspects and advantages will be apparent to those of ordinary skill in the art from the Detailed Description of the Invention and Drawing that follow.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

In accordance with the present invention, a tire pressure indicator is disclosed. The tire pressure indicator is coupled to the valve stem of a tire and provides a visual indication of whether the tire pressure is above or below a predetermined pressure limit. A determination may thus be made by visual inspection of the indicator as to whether the tire pressure is below a tire pressure value recommended for safe operation of the vehicle. Referring to FIGS. 1–8, the tire pressure indicator 10 includes a base 12, a diaphragm 14, a post 16, a spring 18, a collar 20, an indicator 22 and a cover 24. The tire pressure indicator includes first and second camming mechanisms that define first and second rotational orientations of the indicator with respect to the cover as subsequently described. The first camming mechanism is operative during axial movement of the indicator in a first direction when the air pressure is above a specified pressure limit to cause rotation of the indicator into a first rotational orientation with respect to the cover and the second camming mechanism is operative during axial movement of the indicator in a second direction opposite to the first direction when the air pressure is below the specified pressure limit to cause rotation of the indicator into a second rotational orientation with respect to the cover.

Figure 1:
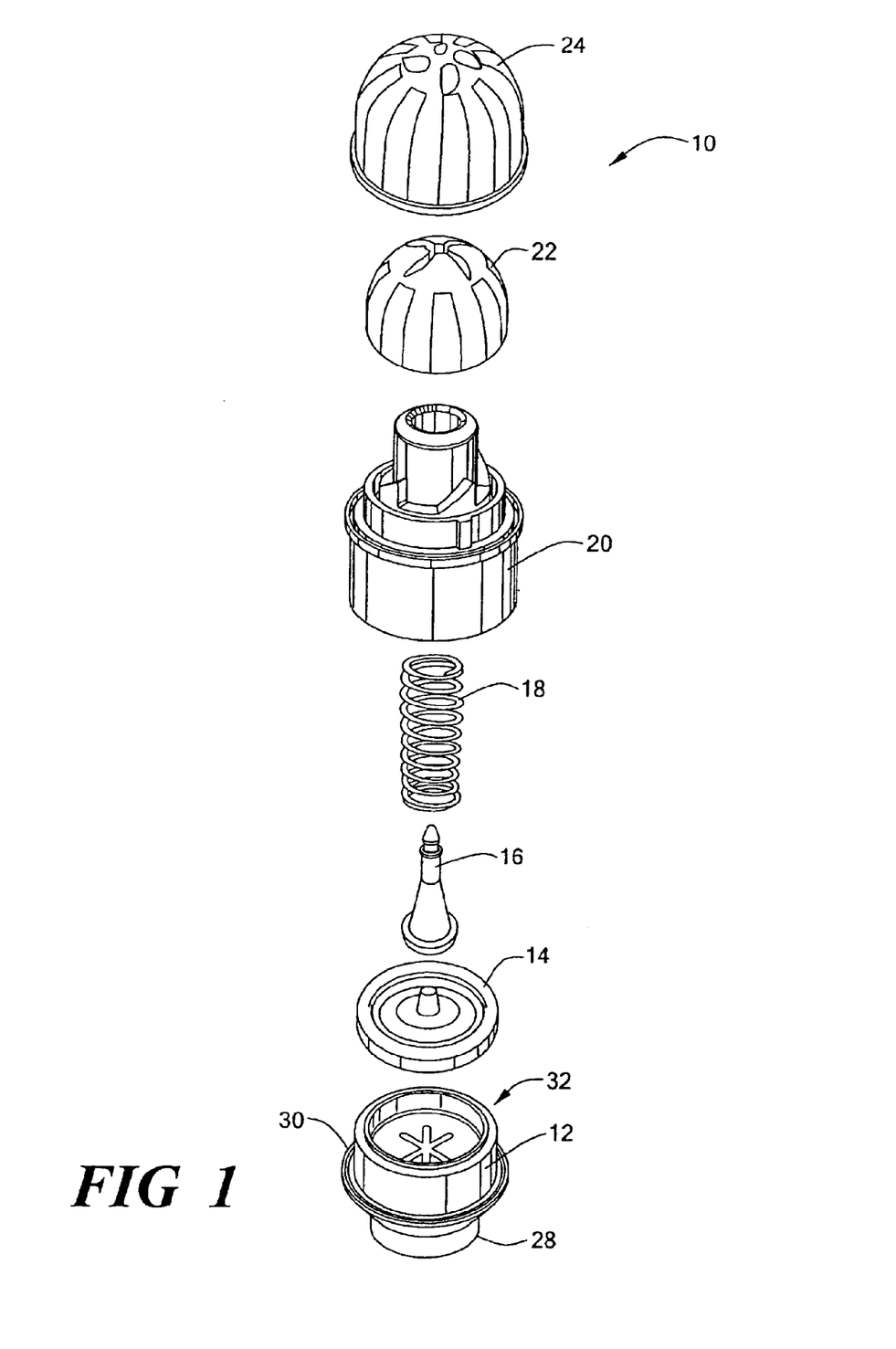
FIG. 1 is an exploded perspective view of a tire pressure indicator in accordance with the present invention.
Figure 2:
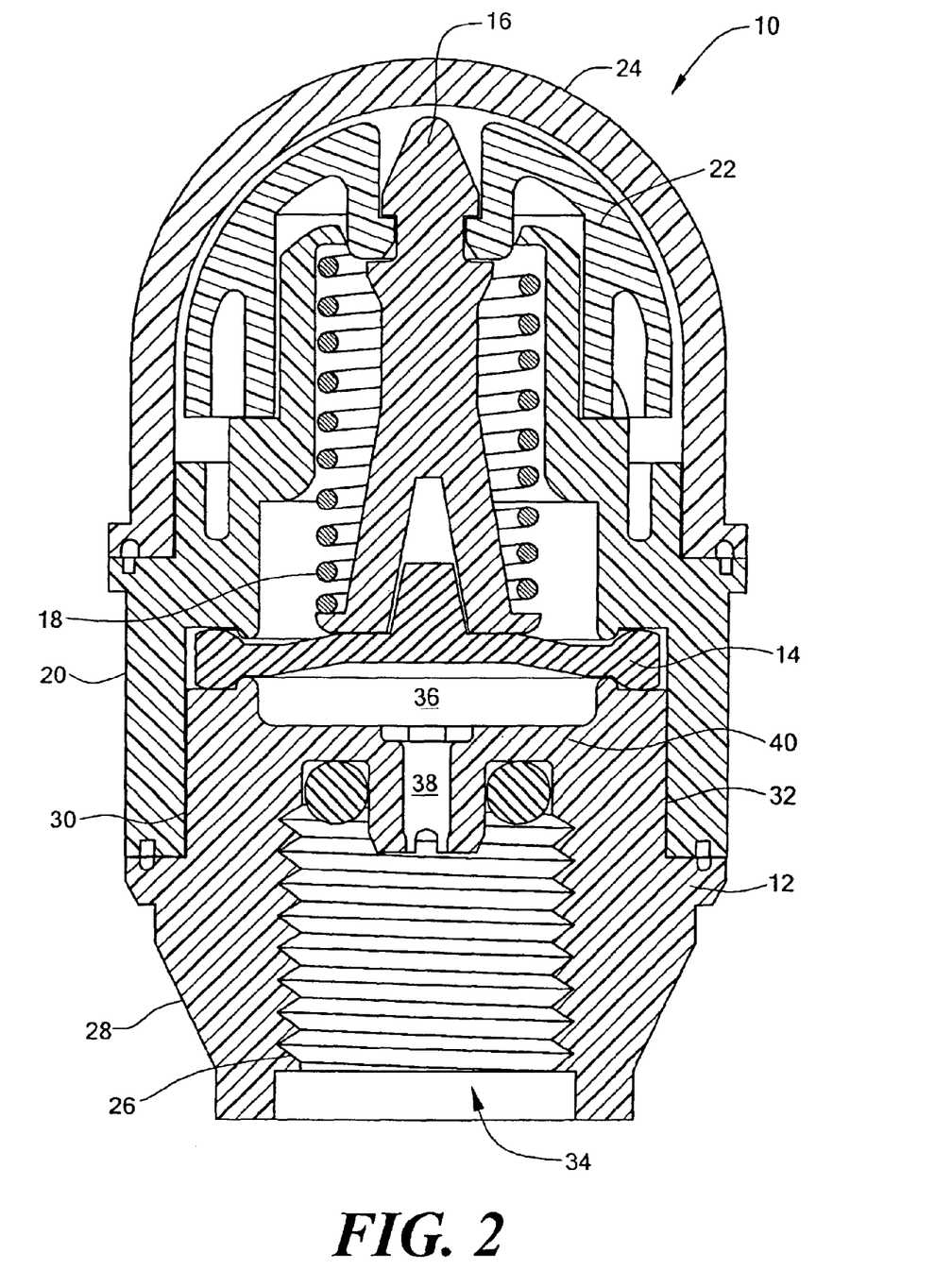
FIG. 2 is a cross-section of the pressure indicator of FIG. 1.
Figure 3A:
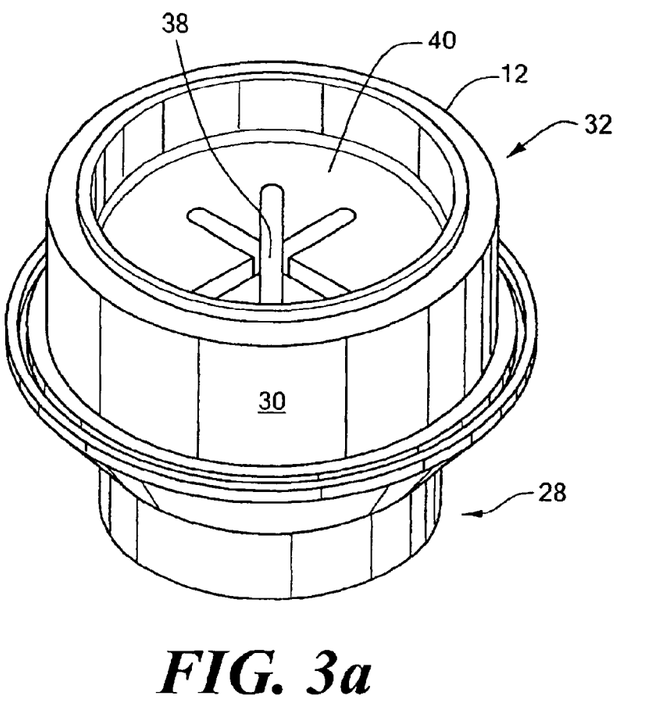
FIG. 3a is a perspective view of the base depicted in the pressure indicator of FIG. 1.
Figure 3B:
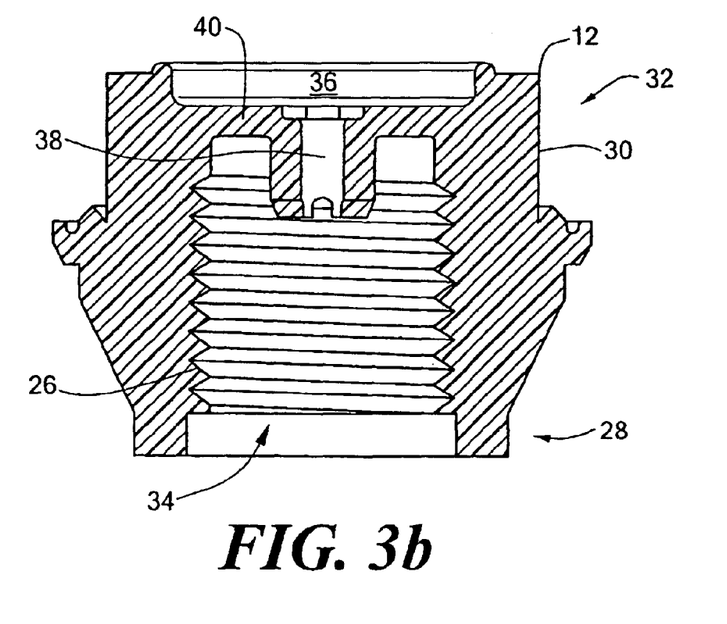
FIG. 3b is a cross-section of the base depicted in the pressure indicator of FIG. 1.

More specifically, female threads 26 are provided at a first end 28 of the base 12 and the second end 32 of the base 12 includes a cylindrical end portion 30. The female threads 26 are typically sized to permit threaded engagement with the male threads of a conventional tire valve (not shown). First and second cavities 34, 36 are formed within the first and second ends 28, 32 of the base 12 respectively and at least one opening 38 is provided between the first and second cavities 34, 36 through a divider 40 to permit pressure equalization therebetween.

Figure 4A:
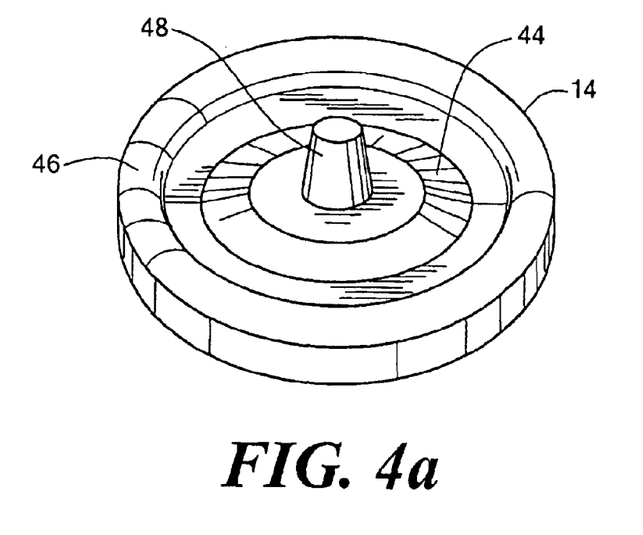
FIG. 4a is a perspective view of the diaphragm depicted in the pressure indicator of FIG. 1.
Figure 4B:
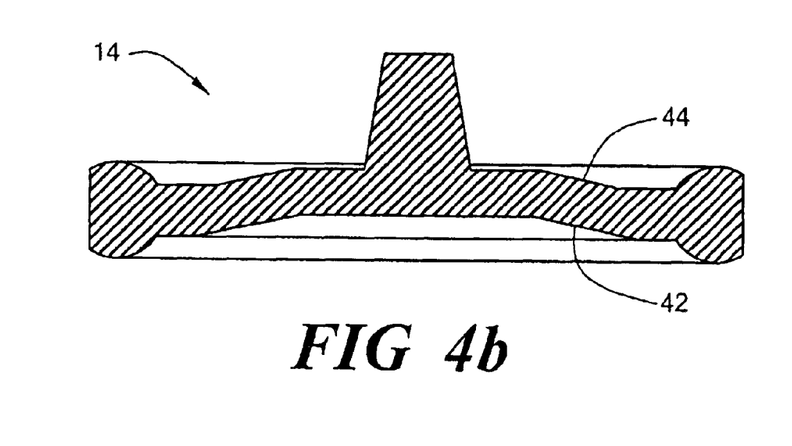
FIG. 4b is a cross-section of the diaphragm depicted in the pressure indicator of FIG. 1.

The diaphragm 14 is disposed over the second end 32 of the base 12 and includes a first surface 42 facing the second cavity 36 when the diaphragm 14 is disposed on the second end 32 of the base 12. The diaphragm 14 further includes a second surface 44 on the opposing side of the diaphragm 14. The diaphragm 14 comprises a generally circular flexible member that is fabricated out of rubber or any other suitable material and includes a peripheral edge 46 around the circumference of the diaphragm 14. The peripheral edge 46 is captured between the second end 32 of the base and the collar 20 as subsequently discussed. A nib 48 extends generally from the center of the second surface 44 of the diaphragm 14 and serves as a locator for the post 16. The thickness of the diaphragm 14 is determined such that the center of the diaphragm 14 will move a specified distance in the direction away from the base in response to increased air pressure on the first surface 42 of the diaphragm 14 and in the direction toward the base 12 in response to decreased air pressure at the first surface 42 within a defined pressure range.

Figure 5:
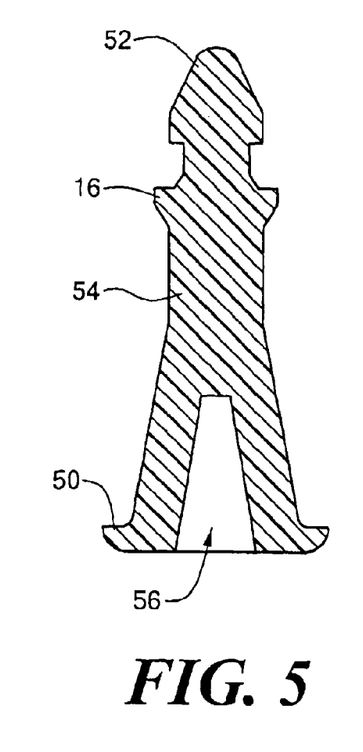
FIG. 5 is a cross-section of the post depicted in the tire pressure indicator of FIG. 1.

The post 16 includes a flange 50 at a first end and a generally conical head 52 at a second end. A shaft 54 couples the flange 50 and the head 52. The underside of the flange 50 includes a recess 56 that is sized to receive the nib 48 projecting from the second surface 44 of the diaphragm 14. In the assembled pressure indicator 10, the post 16 is positioned with the flange 50 abutting the second surface 44 of the diaphragm 14 with the nib 48 extending into the recess 56 within the flange 50 to locate the post 15 on the center of the diaphragm 14.

The spring 18 is disposed coaxially over the post 16 and serves to urge the post 16 and the diaphragm 14 toward the base 12.

Figure 6A:
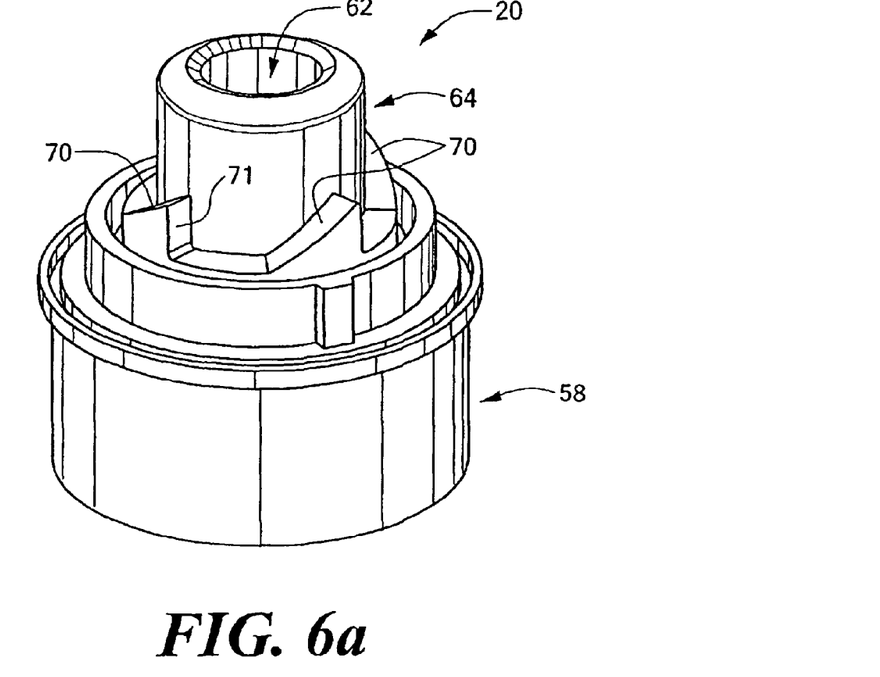
FIG. 6a is a perspective view of the collar depicted in the pressure indicator of FIG. 1.
Figure 6B:
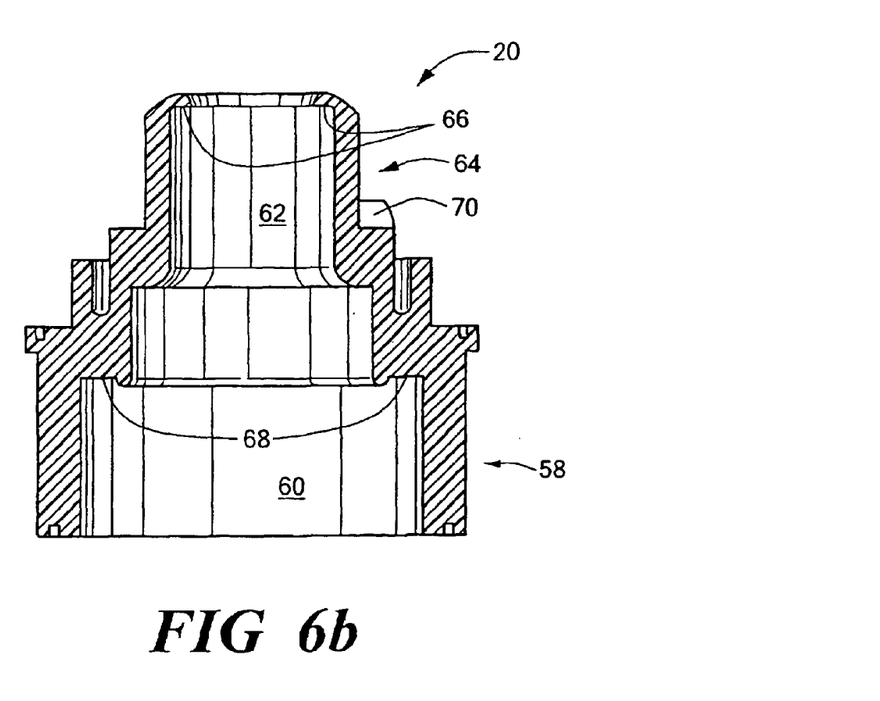
FIG. 6b is a cross-section of the collar depicted in the pressure indicator of FIG. 1.

The collar 20 includes a first end 58 having a generally cylindrical bore 60 sized for a close fit with the cylindrical end portion 30 of the base 12. An opening 62 is provided in the second end 64 of the collar 20 to allow the second end of the post 16 and the head 52 of the post 16 to extend therethrough. Additionally, the second end 64 of the collar 20 includes an interior shoulder 66 that provides an abutment for the spring 18. A lip 68 is provided within the collar 20 that serves to engage the diaphragm 14 and capture the diaphragm 14 in its mounting position between the second end 32 of the base 12 and the lip 68 of the collar 20 when the collar 20 is mounted on the cylindrical end portion 30 of the base 12. A plurality of integrally formed ramps 70 and stops 71 are provided on the exterior surface of the collar 20. The function of the ramps 70 is subsequently discussed in connection with the positioning of the indicator 22. The stops 71 limit the rotational movement of the indicator so as to cause the indicator to assume a defined rotational orientation when the air pressure in a tire to which the tire pressure indicator 10 is coupled, is below a specified threshold pressure value.

Figure 7A:
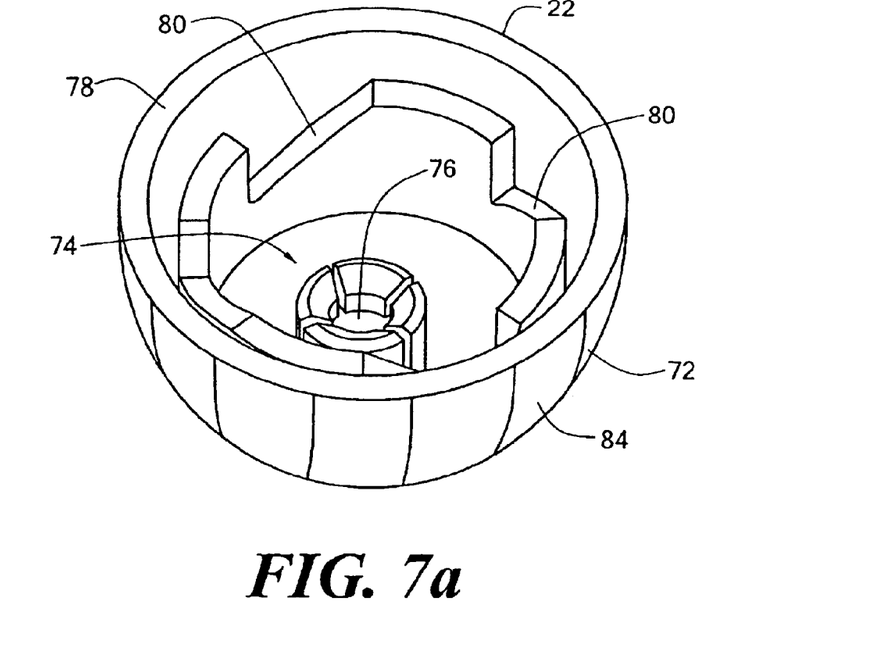
FIG. 7a is a perspective view of the indicator depicted in the pressure indicator of FIG. 1 illustrating the interior of the indicator.
Figure 7B:
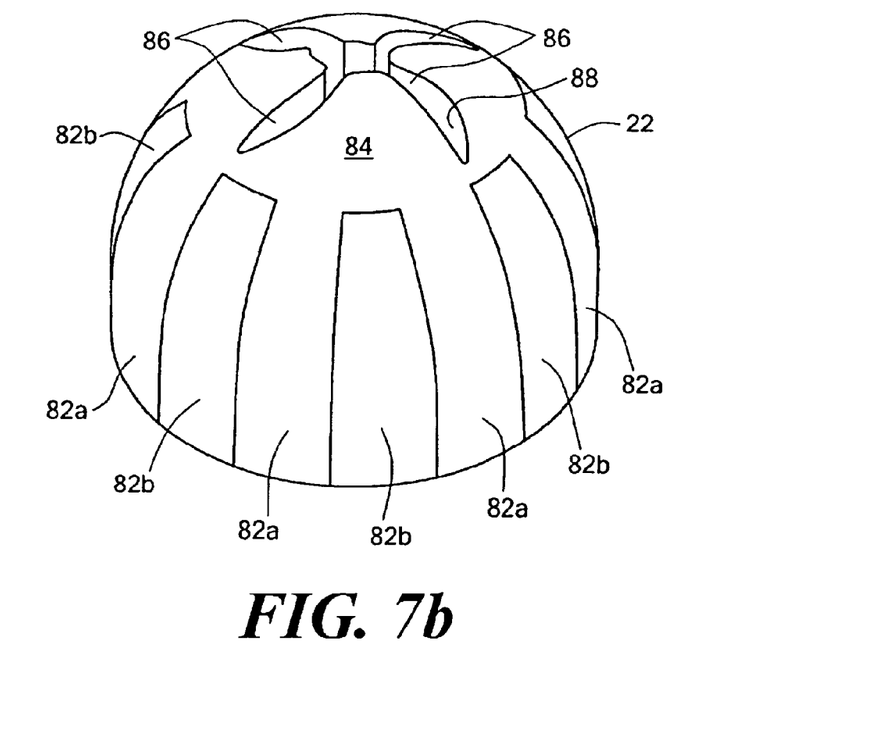
FIG. 7b is a perspective view of the indicator depicted in the pressure indicator of FIG. 1 illustrating alternating colored segments.
Figure 7C:
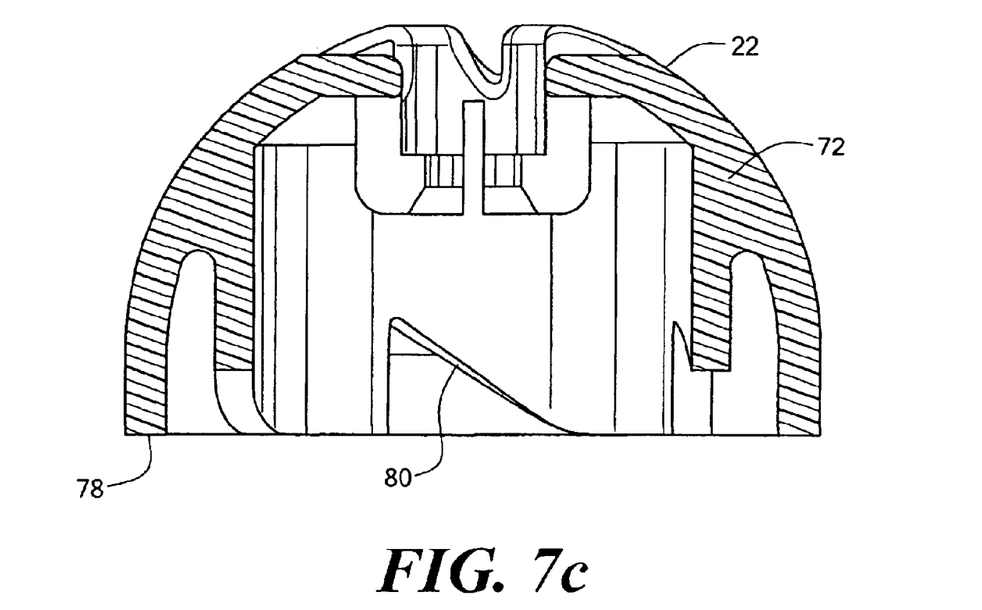
FIG. 7c is a cross-section of the indicator depicted in the pressure indicator of FIG. 1.

The indicator 22 is generally dome shaped and includes a wall 72 defining an interior cavity 74. The indicator 22 has a recess 76 within the interior cavity that is sized to receive and retain the head 52 of the post 16 while permitting free rotatable movement of the indicator 22 around the head 52 of the post 16. While the illustrated post 16 includes generally conical head 52 any suitably shaped head may be employed with a cooperative recess that captively engages the head while permitting rotation of the indicator 22 around the head 52. The indicator 22 is mounted to the post 16 by urging the head 52 of the post 16 into the recess 76. The indicator 22 includes a lower peripheral edge 78 and a plurality of ramps 80 formed within the interior cavity that mate with and are slidable along the ramps 70 of the collar 20. The rotation of the indicator 22 in one direction is limited by the stops 71.

Colored arcuate segments 82 are provided on the outer surface 84 of the wall 72. The segments 82 extend from near the peak of the dome shaped indicator 22 toward the lower peripheral edge 78. In the illustrated embodiment, alternating segments are of the same color; e.g. a first set of segments 82a may be black and a second set of segments 82b located between the first set of segments may be red. The colors specified are purely for illustrative purposes and different colors or visual patterns may be used. Of significance is that the alternating sets of segments be visually distinguishable, one from the other.

A plurality of angled recesses 86 is provided in the outer surface of the indicator 22 that extend radially outward from near the peak of the dome. The angled recesses each include a sloped surface 88 that cooperates with a cooperative projection on the cover 24 to define the rotational orientation of the indicator 22 with respect to the cover 24 when the pressure within a tire to which the pressure indicator 10 is coupled is above a specified threshold limit.

Figure 8A:
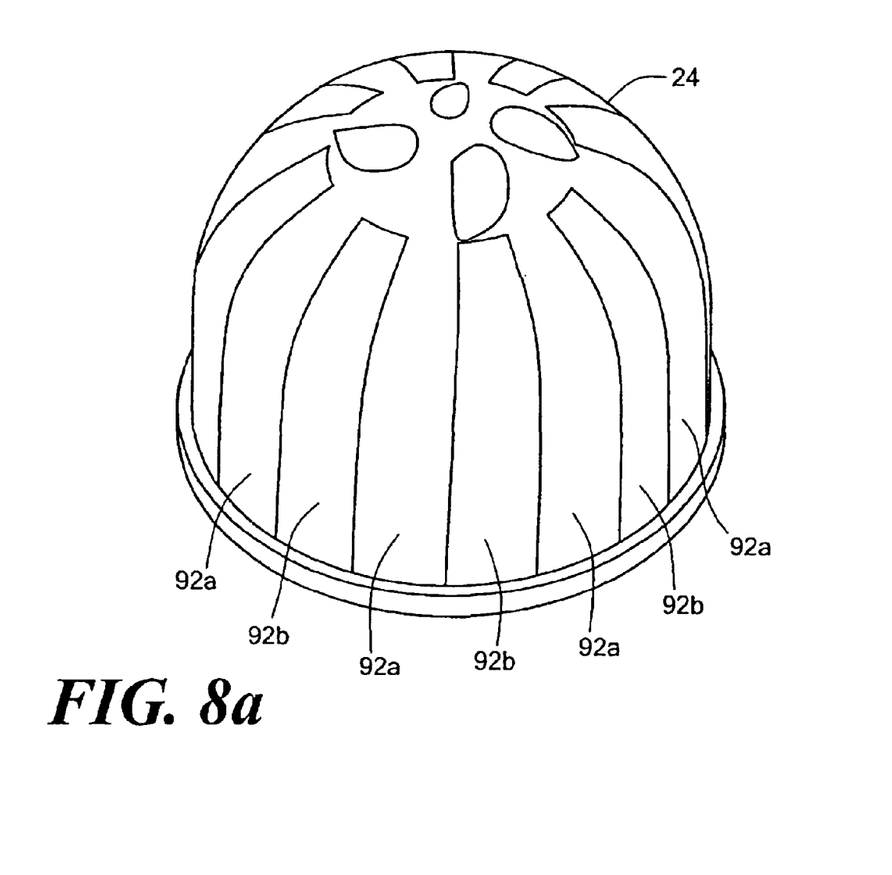
FIG. 8a is a perspective view of the cover depicted in the pressure indicator of FIG. 1 showing alternating clear and opaque segments.

The dome shaped cover 24 is disposed over the indicator 22 and is secured to the collar 20 by ultrasonic welding, an adhesive, or any other suitable means. The cover 24 includes alternating arcuate segments 92 that extend generally from the near the peak of the dome shaped cover 24 to the lower peripheral edge 90 of the cover 24. A first set of the segments 92a that includes every other segment is opaque while the second set of segments 92b, that includes those segments between adjacent segments 92a is transparent. Thus, the segments 82 of the indicator 22 are visible through the clear segments 92b of the cover 24. The cover 24 may be produced via a two-part molding process to produce the transparent and opaque segments 92b, 92a respectively or alternatively, a clear cover may be provided and selected areas may be painted or coated to provide the first set of segments 92a that are opaque.

Figure 8B:
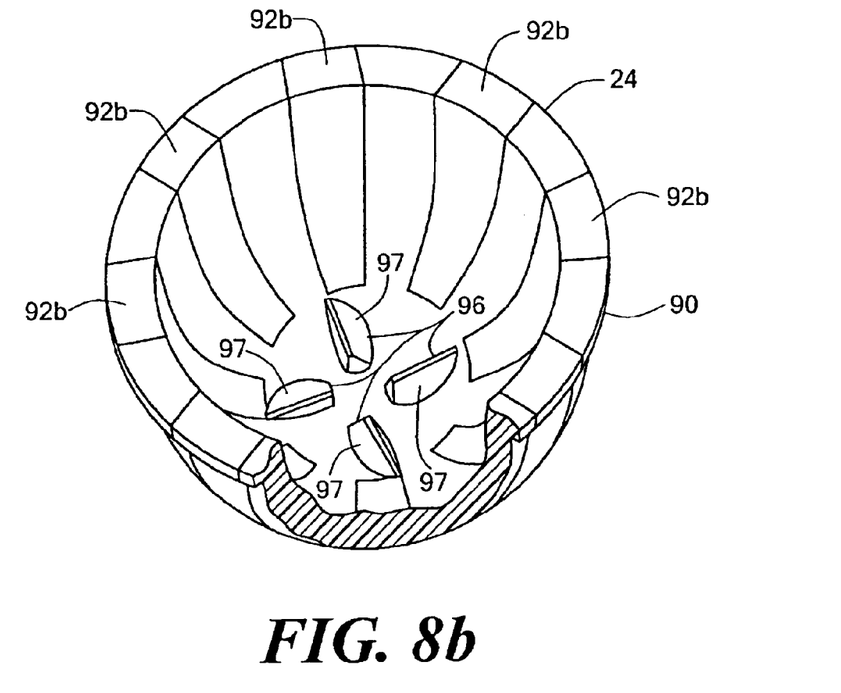
FIG. 8b is a bottom cutaway perspective view of the cover of the pressure indicator of FIG. 1 illustrating ramped recesses formed in the interior of the cover.
Figure 8C:
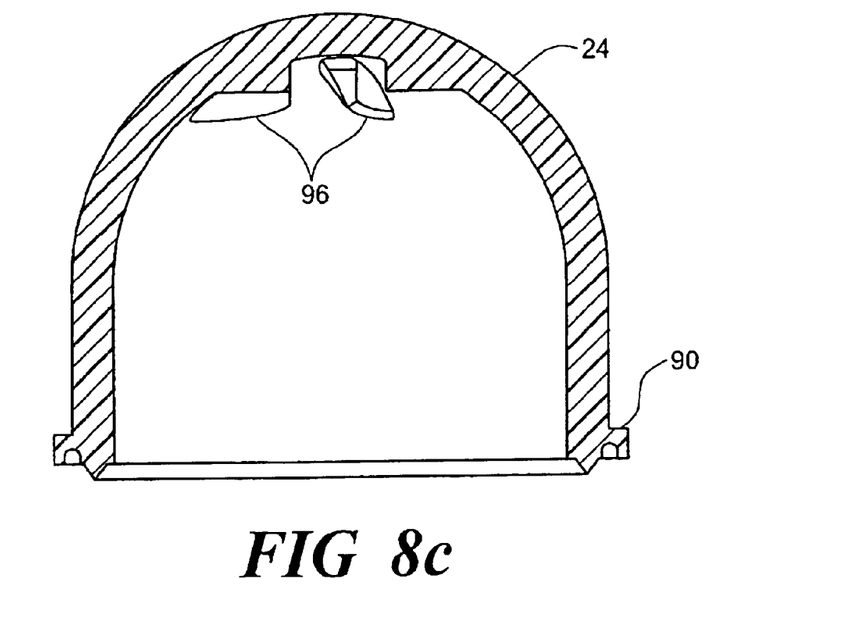
FIG. 8c is a cross-section of the cover of the pressure indicator of FIG. 1 illustrating ramped recesses formed in the interior of the cover.

The cover 24 further includes a plurality of projections 96 that are located inside the cover 24 near the peak of the dome shaped structure. The projections 96 extend outward generally radially from near the peak of the dome shaped structure and are oriented such that the projections 96 are receivable in the angled recesses 86 in the indicator 22. More specifically, the projections 96 each include a ramped surface 97 that is cooperative with the ramped surface 88 of the angled recesses 86 of the indicator 22 to cause the indicator 22 to rotate into a first rotational position in which the segments 82a of the indicator 22 are visible through the clear segments 92b of the cover 24. The indicator 22 rotates into the first position when urged upward as a result of tire pressure in excess of the specified pressure limit as a result of slidable movement of the sloped surfaces 97 of the projections 96 on the sloped surfaces 88 of the recesses 86 of the indicator 22. The viewing of the segments 82a through the segments 92b of the cover indicates that the tire pressure is above the specified threshold limit.

When the tire pressure is below the predetermined threshold limit, the spring 18 urges the post 16 and the diaphragm 14 downward causing the ramps 80 within the interior cavity 74 of the indicator 22 to slide with respect to the ramps 70 on the collar 20 into a second rotational position in which the segments 82b of the indicator 22 are visible through the clear segments 92b of the cover 24. In the foregoing manner a visual indication is provided that the tire pressure is below the specified threshold limit.

It will be appreciated by those of ordinary skill in the art that variations to and modification of the above-described tire pressure indicator may be made without departing from the inventive concepts disclosed herein. Accordingly, the invention should not be viewed as limited except by the scope and spirit of the appended claims.

What is claimed is:

1. A tire pressure indicator for coupling to a threaded valve stem comprising:

a generally dome shaped cover having a cover peak, a cover interior cavity and a lower peripheral edge, said cover having alternating opaque and transparent segments extending at least partially between said cover peak and said lower peripheral edge of said cover, said cover having a longitudinal axis extending through said peak;

a generally dome shaped indicator having a dome peak, a lower peripheral edge and an indicator interior cavity, said indicator having alternating segments having first and second different visual characteristics, said indicator segments extending at least partially from said dome peak to said lower peripheral edge of said indicator, said dome shaped indicator having a pivot axis coincident with said longitudinal axis, said indicator being disposed within said cover interior cavity, rotatable around said pivot axis and axially movable with respect to said cover along said longitudinal axis in response to variations in air pressure applied to said tire pressure indicator;

first and second camming mechanisms, said first camming mechanism operative during axial movement of said indicator in a first direction responsive to air pressure applied to said tire pressure indicator in excess of a first pressure limit to cause rotation of said indicator to a first rotational orientation;

said second camming mechanism operative during axial movement of said indicator in a second direction opposite to said first direction and responsive to air pressure applied to said tire pressure indicator below a second pressure limit to cause rotation of said indicator to a second rotational orientation;

said segments of said indicator having said first visual characteristic being visible through said transparent segments of said cover when said indicator is in said first rotational orientation and said segments of said indicator having said second visual characteristic being visible through said transparent segments of said cover when said indicator is in said second rotational orientation.

2. The tire pressure indicator of claim 1 wherein said cover includes an inner surface and said indicator includes an outer surface and said first camming mechanism includes a first set of ramped surfaces on said inner surface of said cover and a second set of ramped surfaces on said outer surface of said indicator.

3. The tire pressure indicator of claim 2 wherein said first set of ramped surfaces comprises surfaces of projections extending from said inner surface of said cover, and said second set of ramped surfaces comprises selected surfaces within recesses in said outer surface of said indicator.

4. The tire pressure indicator of claim 2 wherein said first set of ramped surfaces comprises selected surfaces within recesses in said inner surface of said cover, and said second set of ramped surfaces comprises selected surfaces of projections extending from the outer surface of said indicator.

5. The tire pressure indicator of claim 1 further including a collar having an outer surface, wherein said second camming mechanism includes a first set of ramped surfaces in the interior cavity of said indicator that are cooperative with a second set of ramped surfaces integrally formed on the outer surface of said collar.

6. The tire pressure indicator of claim 1 further including a collar having an interior defining a central opening therethrough, first and second ends, an outer surface and a shoulder within said interior at said second end of said collar, said cover being mounted to said second end of said collar;

said first camming mechanism including a first set of ramped surfaces on an inner surface of said cover and a second set of ramped surfaces on an outer surface of said indicator and, said second camming mechanism including a third set of ramped surfaces in the interior cavity of said indicator and a fourth set of ramped surfaces integrally formed on the outer surface of said collar.

7. The tire pressure indicator of claim 6 wherein said collar further includes a shoulder at said collar second end and said tire pressure indicator further includes:

a body having first and second ends, said body having a female threaded portion at said body first end for coupling to said threaded valve stem and having an at least one opening defining an internal air passage between said first and second ends, said first end of said collar being mounted to said second end of said body;

a diaphragm securely retained between said body and said collar and having a central portion that is movable generally along an axis normal to said diaphragm, said diaphragm forming an air seal at said second end of said body;

a post having a flange at a first end, a head at a second opposing end and a shaft intermediate the flange and the head, said flange abutting a second surface of said diaphragm and said head captively retained within an opening in said indicator while permitting rotation of said indicator about said post; and a spring disposed in compression between said shoulder of said collar and said flange.

8. The tire pressure indicator of claim 7 wherein said spring comprises a coil spring that is disposed around said post.

9. The tire pressure indicator of claim 7 wherein said diaphragm includes a nib extending from said second surface of said diaphragm and said first end of said post includes an opening sized to receive said nib, said nib disposed in said opening in said post to position said post on said diaphragm.

10. The tire pressure indicator of claim 7 wherein said body includes female threads at said first end sized to threadably mate with said threaded valve stem.

11. The tire pressure indicator of claim 1 wherein said first visual characteristic is a first color and said second visual characteristic is a second different color.

12. A tire pressure indicator for coupling to a threaded valve stem comprising:

a body having a first end and a second end, said first end having a female threaded opening for coupling to said threaded valve stem, said second end having an opening defining a cavity, said body having a passageway permitting fluid communication between said opening and said cavity;

a diaphragm abutting said second end of said body, said diaphragm including a first surface facing said cavity and a second opposing surface, said diaphragm having a center portion that is deformable in response to variations in air pressure at said first end of said body;

a collar having a first end and a second end, said first end of said collar being mounted to said second end of said body so as to capture said diaphragm between said collar and said body at said second end of said body and form an air seal at said second end;

a post having a first end, a second end and a shaft intermediate the first and second ends of said post, said first end of said post abutting said second surface of said diaphragm and axially movable along a longitudinal axis of said tire pressure indicator in response to deformation of said diaphragm;

a cover mounted to said collar; and an indicator having an outer surface, said indicator disposed within said cover and coupled to said second end of said post so as to provide axial movement of said indicator in response to deformation of said diaphragm while permitting rotation of said indicator about said second end of said post, said indicator having first and second visual characteristics on selected portions of said outer surface, wherein said first visual characteristic is viewable through at least one selected portion of said cover when said indictor is in a first rotational orientation and wherein said second visual characteristic is viewable through said at least one selected portion of said cover when said indicator is in a second rotational orientation;

said indicator being rotatable into said first rotational orientation responsive to axial movement of said indicator in a first direction produced by the application of air pressure at said first end of said body in excess of a first threshold pressure value and said indicator being rotatable into said second rotational orientation responsive to axial movement of said indicator in a second direction opposite to said first direction produced by the application of air pressure at said first end of said body below a second specified threshold pressure value.

* * * * *